(12) United States Patent
Ketharaju et al.

(10) Patent No.: US 11,768,947 B1
(45) Date of Patent: Sep. 26, 2023

(54) DISTRIBUTED DATA SECURITY

(71) Applicant: Wells Fargo Bank, N.A., San Francisco, CA (US)

(72) Inventors: Rameshchandra Bhaskar Ketharaju, Hyderabad (IN); Ravi Babu Bandla, Bangalore (IN); Hem Shankar Karlapalem, Bengaluru (IN); Sarath Chava, Hyderabad (IN); Rama Rao Yadlapalli, Hyderabad (IN); Ajay Kumar Rentala, Hyderabad (IN); Vamsi Krishna Geda, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 167 days.

(21) Appl. No.: 17/408,039

(22) Filed: Aug. 20, 2021

Related U.S. Application Data

(60) Continuation of application No. 16/721,173, filed on Dec. 19, 2019, now Pat. No. 11,126,735, which is a division of application No. 15/089,002, filed on Apr. 1, 2016, now Pat. No. 10,546,138.

(51) Int. Cl.
G06F 21/60 (2013.01)
G06F 21/78 (2013.01)
G06F 21/62 (2013.01)

(52) U.S. Cl.
CPC ........ *G06F 21/602* (2013.01); *G06F 21/6218* (2013.01); *G06F 21/78* (2013.01)

(58) Field of Classification Search
None
See application file for complete search history.

(56) References Cited

U.S. PATENT DOCUMENTS

| | | | |
|---|---|---|---|
| 5,999,967 A | 12/1999 | Sundsted | |
| 6,393,568 B1 | 5/2002 | Ranger et al. | |
| 8,401,185 B1 | 3/2013 | Telang | |
| 8,677,132 B1 | 3/2014 | Liao et al. | |
| 8,924,739 B2 * | 12/2014 | Horn | G06F 21/78 |
| | | | 713/189 |
| 8,929,555 B2 | 1/2015 | Wei | |
| 9,158,927 B1 * | 10/2015 | Franklin | G06F 21/602 |
| 9,407,437 B1 | 8/2016 | Campagna | |
| 9,779,268 B1 * | 10/2017 | Colgrove | G06F 21/6227 |
| 10,546,138 B1 * | 1/2020 | Ketharaju | G06F 21/6218 |
| 2002/0044655 A1 | 4/2002 | Applebaum | |
| 2002/0164020 A1 | 11/2002 | Mustafa | |
| 2003/0037248 A1 | 2/2003 | Launchbury et al. | |
| 2003/0163737 A1 | 8/2003 | Roskind | |
| 2005/0182932 A1 | 8/2005 | Wheeler | |

(Continued)

FOREIGN PATENT DOCUMENTS

JP 2015069192 A 4/2015

OTHER PUBLICATIONS

Venckauskas et al., "Generation of the Secret Encryption Key Using the Signature of Embedded Systems," Information Technology and Control, vol. 41, No. 4, pp. 368-375 (2012).

(Continued)

*Primary Examiner* — Venkat Perungavoor
(74) *Attorney, Agent, or Firm* — Merchant & Gould P.C.

(57) ABSTRACT

First data from a user device is received on an electronic computing device. The first data is encrypted to generate second data. The second data is fragmented and stored in a plurality of data stores.

15 Claims, 5 Drawing Sheets

(56) References Cited

U.S. PATENT DOCUMENTS

| | | |
|---|---|---|
| 2005/0208891 A1 | 9/2005 | Khare et al. |
| 2006/0045270 A1 | 3/2006 | Cohen |
| 2006/0179153 A1 | 8/2006 | Lee et al. |
| 2009/0006869 A1 | 1/2009 | Satya Sudhakar |
| 2009/0320099 A1 | 12/2009 | Rao et al. |
| 2009/0327751 A1 | 12/2009 | Koifman et al. |
| 2010/0091986 A1 | 4/2010 | Wakayama et al. |
| 2010/0293097 A1 | 11/2010 | Pomeroy |
| 2011/0202546 A1 | 8/2011 | Amit et al. |
| 2012/0033809 A1 | 2/2012 | Huang |
| 2012/0057696 A1* | 3/2012 | Chew .................. H04L 9/0894 380/30 |
| 2012/0117341 A1* | 5/2012 | Amit ..................... G06F 16/116 711/159 |
| 2012/0159098 A1 | 6/2012 | Cheung et al. |
| 2013/0173716 A1 | 7/2013 | Rogers |
| 2013/0198151 A1 | 8/2013 | Sentinelli et al. |
| 2013/0304816 A1 | 11/2013 | Reguna et al. |
| 2013/0339324 A1 | 12/2013 | Koifman et al. |
| 2014/0047555 A1 | 2/2014 | Didier |
| 2014/0355754 A1* | 12/2014 | Leung .................... H04L 9/065 380/28 |
| 2015/0052354 A1 | 2/2015 | Purohit |
| 2015/0142863 A1 | 5/2015 | Yuen et al. |
| 2015/0286435 A1* | 10/2015 | Hwang ............... G06F 11/1458 711/162 |
| 2015/0310219 A1 | 10/2015 | Haager et al. |
| 2015/0378837 A1* | 12/2015 | Bai ..................... G06F 11/1435 707/654 |
| 2017/0212701 A1 | 7/2017 | Shifman et al. |
| 2017/0293766 A1 | 10/2017 | Schnjakin et al. |
| 2017/0372078 A1* | 12/2017 | Lewis ................. G06F 21/6218 |
| 2018/0205707 A1 | 7/2018 | Bellala et al. |
| 2019/0156045 A1* | 5/2019 | Lewis ..................... G06F 3/067 |
| 2020/0026868 A1 | 1/2020 | Flowers et al. |
| 2020/0106600 A1 | 4/2020 | Dreifus |
| 2021/0286884 A1* | 9/2021 | Lewis ................. H04L 63/0435 |

OTHER PUBLICATIONS

CN 109684859. English Translation (Year: 2019).
CN 111181938. English Translation (Year: 2020).
Private and Anonymous Data Storage and Distribution in Cloud. Duan. IEEE (Year: 2013).
Security of Cloud Computing, Storage, and Networking. Hamdi. IEEE (Year: 2012).

* cited by examiner

DISTRIBUTED DATA SECURITY

BACKGROUND

Messages and data transmitted between computing devices on a network can be vulnerable to hackers. Because hackers can intercept the messages and sometimes process content in the messages and data, organizations commonly encrypt sensitive data before transmitting the sensitive data through the network.

The messages and data can also be stored on data stores and other computer systems accessible on the network. The messages and data that are stored on the data stores and other computer systems can also be vulnerable to hackers.

SUMMARY

Embodiments of the disclosure are directed to a method implemented on an electronic computing device for processing data in a secure manner, the method comprising: on the electronic computing device, receiving first data from a user device; encrypting the first data to generate second data; fragmenting the second data; and storing the second data in a plurality of data stores.

In another aspect, an electronic computing device comprising: a processing unit; and system memory, the system memory including instructions which, when executed by the processing unit, cause the electronic computing device to: receive first data from a user device; generate an encryption key from the first data; use the encryption key to encrypt the first data, the encryption of the first data generating second data; fragment the second data into a plurality of sections; and store each section of the second data in one of a plurality of data stores.

In yet another aspect, an electronic computing device includes a processing unit; and system memory, the system memory including instructions which, when executed by the processing unit, cause the electronic computing device to: receive first data from a user device, wherein the first data has been jumbled by the user device; generate an encryption key from the first data, the encryption key being obtained from a header in the first data; use the encryption key to encrypt the first data, the encryption of the first data generating second data; fragment the second data into a plurality of sections; store each section of the second data in one of a plurality of data stores located in a plurality of geographical locations; access the second data in the plurality of data stores; defragment the second data to generate third data; unencrypt the third data to generate fourth data, the fourth data including a plurality of sections, each section including a section pointer that identifies an order for the section in the fourth data; and send the fourth data to the user device.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods that support distributed data security. In certain embodiments of the systems and methods described herein, data from a client device that is to be stored in a data store is first jumbled to rearrange an order of the data. The jumbled data is then sent to a data store server where the jumbled data is encrypted and fragmented. Fragmented portions of the encrypted jumbled data are then stored on a plurality of data stores, some or all of which can be in disparate geographical locations.

As described above, examples of the systems and methods provide for multiple layers of security for the data. A first level of security can occur when the data is jumbled to rearrange the order of the data. A second level of security can occur when the jumbled data is encrypted. A third level of security can occur when the encrypted, jumbled data is fragmented and the fragmented portions of the encrypted, jumbled data are stored in the disparate data stores in the disparate geographical locations.

In addition, a fourth level of security can occur as a result of an encryption seed used as part of a process of encrypting the jumbled data at the data store server. The encryption seed can provide a starting point for an encryption process. The encryption seed can be derived from the actual jumbled data to be encrypted, thereby providing a randomly generated encryption seed. In some implementations, the encryption seed can be obtained from a header of the jumbled data. In other implementations, the encryption seed can be obtained from a portion of the jumbled data according to a set of rules. The rules can determine, for example, offsets in the jumbled data that can be used to obtain the encryption seed. Other methods can be used for obtaining the encryption seed.

The example systems and methods also provide for decrypting and unjumbling data to be obtained from the plurality of data stores. As discussed in more detail later herein, when stored data is to be obtained, the stored data is obtained from the plurality of data stores that store the data and fragmented data is reassembled and decrypted and sent back to the user device. The user device then unjumbles the data. As defined in this disclosure, fragmenting comprises breaking up a contiguous data file.

The systems and methods disclosed herein are directed to a computer technology that solves an existing problem in storing data in a secure manner. The systems and methods provide for a table of indexes that can locate each fragmented segment of data in an efficient manner. The fragments can then be efficiently reassembled, decrypted and returned to the user device.

Figure 1:
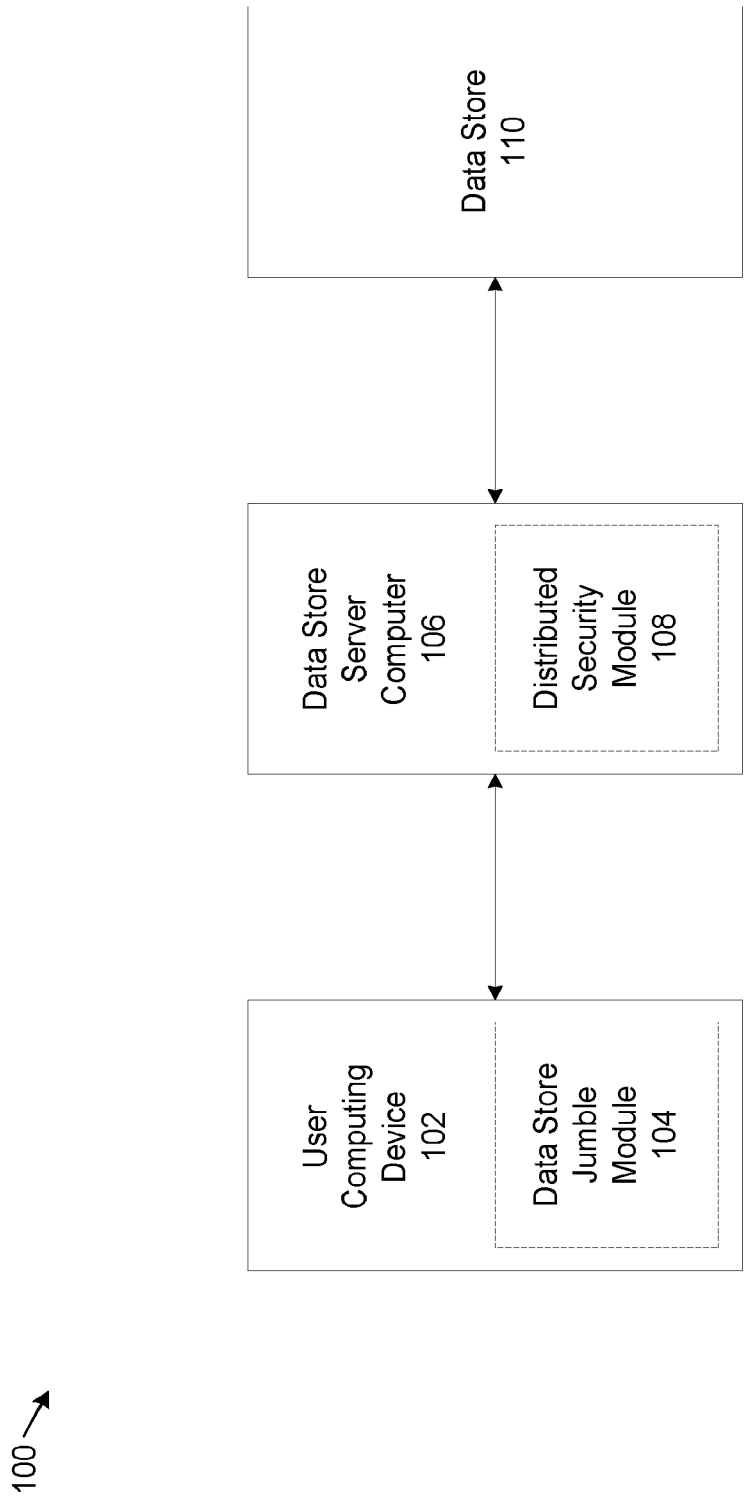
FIG. 1 shows an example system that supports distributed data security.

FIG. 1 shows an example system 100 that supports distributed data security. The example system 100 includes a user computing device 102, a data store server computer 110 and data stores 110. The user computing device 102 includes a data store jumble module 104. The data store server computer includes a distributed security module 108.

The example user computing device 102 is an electronic computing device of a user that can comprise one a smartphone, a tablet computer, a laptop computer or a desktop computer. More than one user computing device 102 can be used. Data can be sent to data store server computer 106 from user computing device 102 for storage on one or more of data stores 110.

The example data store jumble module 104 is a software module on user computing device 102 that can jumble data being sent from user computing device 102 and unjumble data being received at user computing device 102.

As used in this disclosure, jumbling comprises changing an arrangement of the data before the data is sent from the user computing device 102 so that the arrangement of the data is different than an original arrangement of the data. For example, if an original arrangement of the data consists of a header followed by one or more sections of data, the header and each of the one or more sections of data can be rearranged so that the header no longer appears first in the data and so that the order of the one or more sections of data is changed. A series of section pointers can be created during a jumbling process to identify an offset for the header and each of the sections of the jumbled data. The section pointers can be used to recreate the jumbled data into an original order of the data.

One or more algorithms can be used to determine how the original order to the data is to be jumbled. For example, an algorithm can identify sections of the original data such as a header and other identifiable sections and randomize or otherwise determine an order for the identifiable sections. In some implementations, instead of jumbling the identifiable sections of the original data such as the header and the other identifiable sections, random parts of the original data can be jumbled. For example, an algorithm can determine to create a first section of rearranged data from a random offset from a start of the original data. In this example, the first section of the rearranged data can also have a random length. Then a second section of the rearranged data can come from another random offset of the original data. Section pointers can be created to identify offsets and lengths for each of the sections of the rearranged data. The section pointers can be sent to the data store server computer 106 along with the jumbled data. Other algorithms for jumbling the data are possible.

The example data store server computer 106 is a server computer that can access data stores 110 and store data on data stores 110. The data store server computer 106 can also obtain data that is stored on data stores 110, decrypt and defragment the obtained data and send the obtained data to user computing device 102.

The example distributed security module 108 can receive jumbled data from user computing device 102, encrypt the jumbled data, fragment the encrypted jumbled data, store the fragmented, encrypted, jumbled data on data stores 110 and identify which fragments of the fragmented, encrypted, jumbled data are stored on which of data stores 110. In addition, the distributed security module 108 can perform reverse operations of obtaining data stored on data stores 110, defragmenting the obtained data and decrypting the obtained data.

The example data stores 110 comprise a plurality of data stores that are accessible from data store server computer 106. Each data store comprises a repository for persistently storing and managing collections of data. A data store can be a repository such as a database, but can also include resource files such as text, image, media or any proprietary format. Sections of fragmented, encrypted data from data store server computer 106 can be stored one or more of data stores 110. Data stores 110 can be located in various geographical locations. Security is enhanced by storing fragments of the original data in diverse locations.

Figure 2:
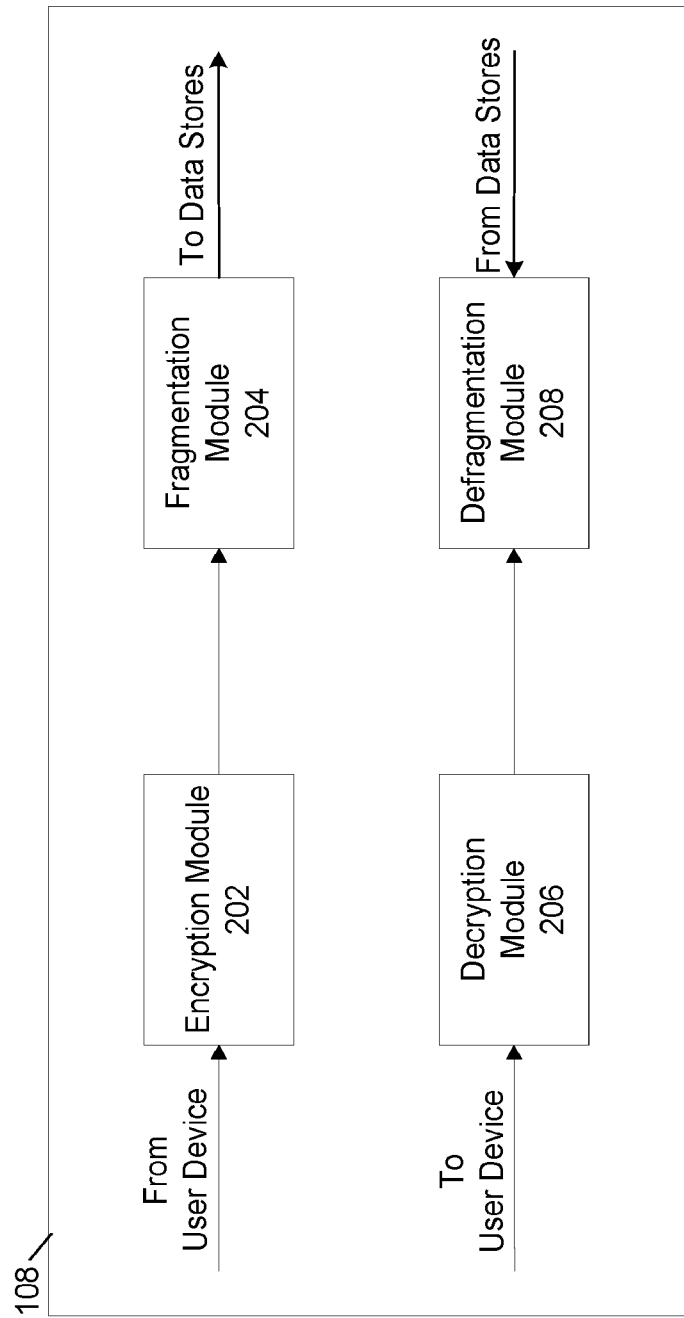
FIG. 2 shows example modules of the distributed security module of FIG. 1.

FIG. 2 shows example modules of the distributed security module 108. The example modules of the distributed security module 108 include an encryption module 202, a fragmentation module 204, a decryption module 206 and a defragmentation module 208.

The example encryption module 202 receives jumbled data from user computing device 102 and encrypts the jumbled data. As discussed, the jumbled data comprises user data that has been rearranged in order. The encryption module 202 can encrypt the jumbled data by applying a hash function to the jumbled data. The hash function is derived from an encryption seed which provides a starting point for the encryption process. As discussed earlier herein, the encryption seed can be derived from the jumbled data to be encrypted.

The example fragmentation module 204 receives the jumbled data that has been encrypted by the encryption module 202 and fragments the jumbled, encrypted data into a plurality of fragments. The fragmentation module 204 can include one or more algorithms that can instruct the fragmentation module 204 on how to fragment the jumbled, encrypted data. For example, the algorithm can identify sections of the jumbled, encrypted data to be fragmented. In some implementations, the length of each fragmented section can be randomly generated. In other implementations, the length of each fragment can be identical.

The fragmentation module 204 stores each fragment in one of data stores 110. In some implementations, each of a plurality of data stores 110 can be identified and each fragment can be stored in one of the plurality of data stores 110 in sequence. In other implementations the fragmentation module 204 can use an algorithm to determine which of the plurality of data stores 110 each fragment should be stored.

The fragmentation module 204 also stores data store keys that identify which of the plurality of data stores 110 each stores each fragment. The data store keys can be stored in a fragmentation table within the fragmentation module 204. The fragmentation table can store data store keys for each fragment, identifying a data store 110 in which the fragment is stored.

The example defragmentation module 208 obtains data fragments from the plurality of data stores and assembles the data fragments into a defragmented segment. The defragmentation module 208 uses the data store keys in the fragmentation table to assemble the fragments in a correct order. The order of the fragmented segments in the defragmented segment corresponds to the order of the jumbled, encrypted output of the encryption module 202.

The example decryption module 206 decrypts the defragmented segment and generates the same jumbled data that was sent from the user computing device 102 to the encryption module 202. The decryption module 206 uses a decryption key to decrypt the defragmented segment. The decryption key corresponds to the hash function that is used to encrypt the jumbled user data in the encryption module 202.

The distributed security module 108 also includes an application programming interface (API) that permits requests to be received at the data store server computer 106 regarding a status of the user data that is stored on the data stores 110. For example, the API can provide status regarding what user data is stored on data stores 110, when the data was stored and an identity of the data stores that store the user data. Other status is possible.

Figure 3:
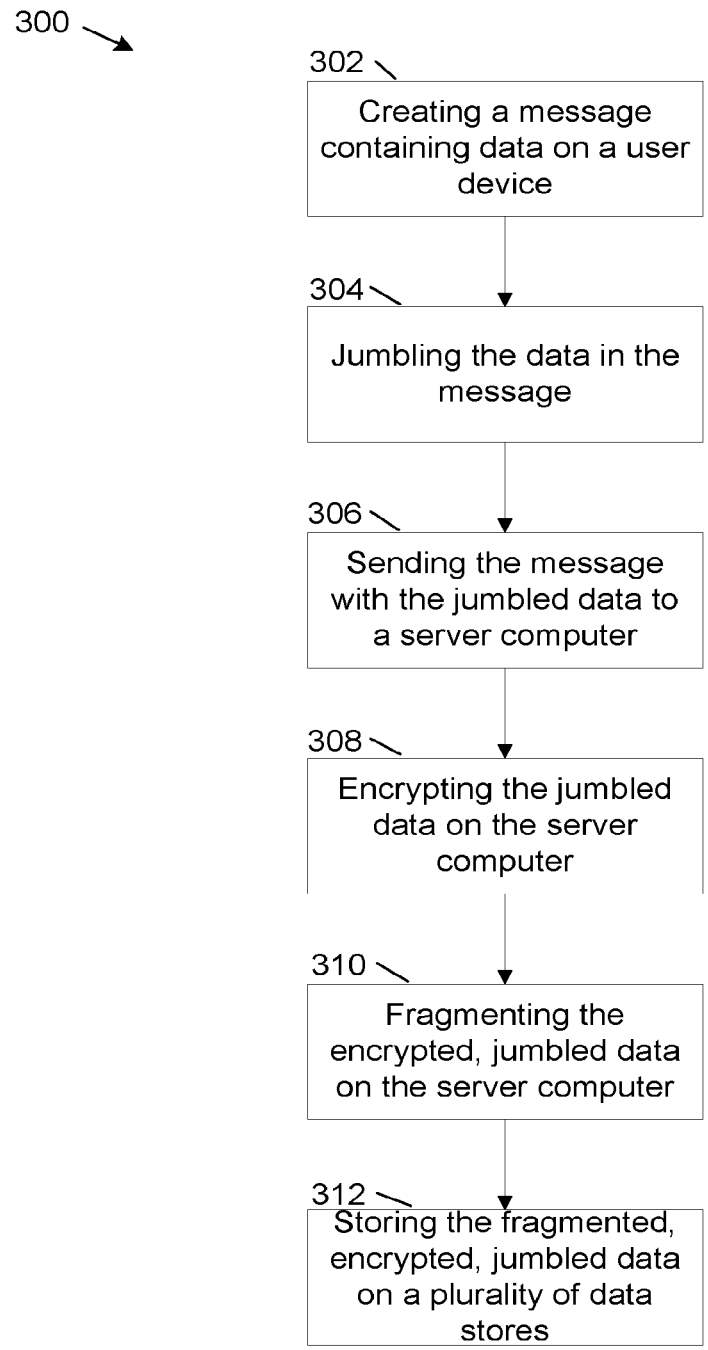
FIG. 3 shows a flowchart of an example method for storing user data in a distributed data store.

FIG. 3 shows a flowchart of an example method 300 for storing user data on a distributed data store in a secure manner. The distributed data store comprises one or more of data stores 110.

At operation 302, a message containing user data is created on a user computing device 102. The user data can comprise any type of text document. The message includes the text document and a header. The header can include information such as a date of the message, a from and to address and a subject of the message. Other types of information can be included in the header.

At operation 304, the data in the message is jumbled on the user computing device 102. Jumbling the data comprises rearranging an order of the data. An algorithm on user computing device 102 can be used to determine how the order of the data is rearranged. When rearranging the order of the data, the algorithm can identify specific sections in the data and rearrange an order of the specific sections. The algorithm can also randomly generate offsets in the document to create sections of the document and rearrange an order of those sections. For example, a first section can start at a beginning of the header and end at a length determined by the algorithm. A second section can start at an offset of the length of the first section from the start of the document and end at another randomly generated length. Other ways to identify sections in the data to rearrange are possible.

At operation 306, the message with the jumbled data is sent to a server computer, for example to data store server computer 106. The message is sent to the server computer so the data in the message can be stored in a secure manner.

At operation 308, the server computer encrypts the jumbled data in the message. The encryption module 202 encrypts the jumbled data with an encryption key created from an encryption seed that is generated from a hash of the jumbled data.

At operation, 310, the encrypted, jumbled data from operation 308 is fragmented to sections. The server computer uses an algorithm to determine how the encrypted, jumbled data is to be fragmented. The algorithm determines a size of each fragmented section of the encrypted, jumbled data.

At operation 312, each fragmented section of the encrypted, jumbled data is stored on one of the plurality of data stores 110. The distributed security module 108 determines which fragmented section is stored in which of the plurality of data stores 110. The distributed security module 108 also keeps track of which fragment is stored in which data store. For method 300, the distributed security module 108 maintains a table that includes an identifier for each fragment and an identifier for which of the plurality of data stores 108 the fragment is stored.

Figure 4:
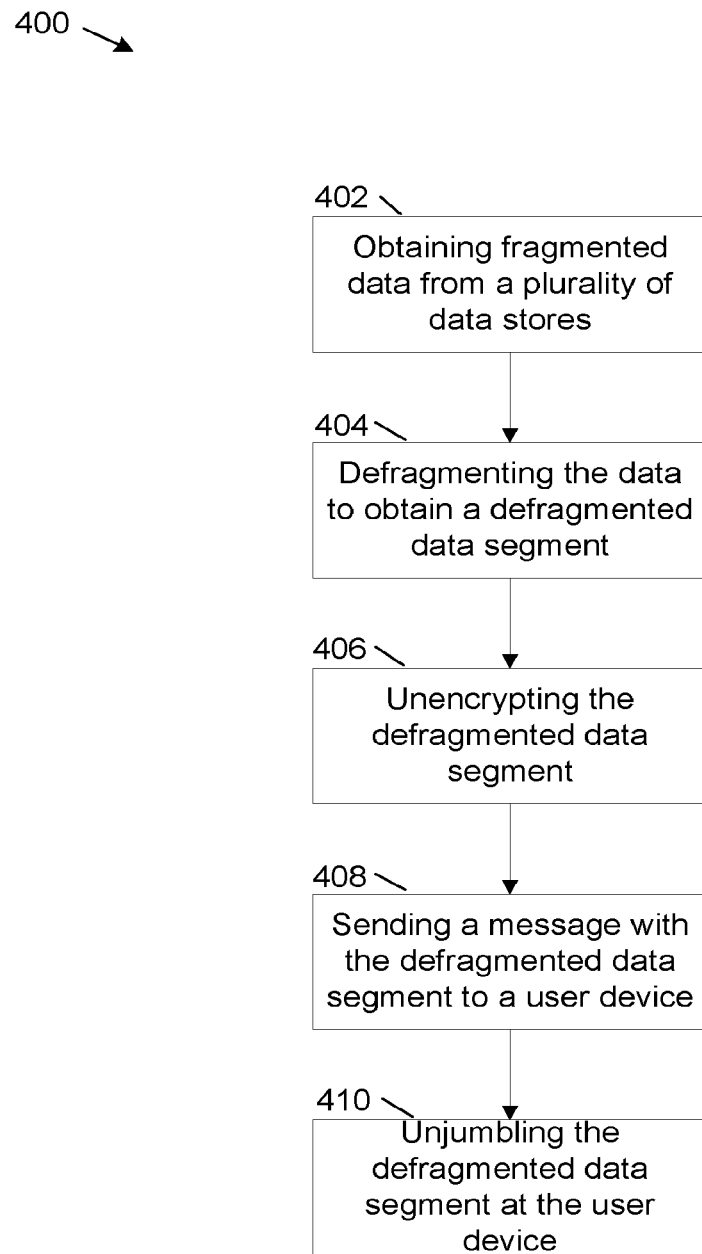
FIG. 4 shows a flowchart of an example method for retrieving data stored in the distributed data store.

FIG. 4 shows a flowchart of an example method 400 for retrieving data stored in the plurality of data stores 110.

At operation 402, fragmented data is obtained from a plurality of data stores 110.

At operation 404, the obtained fragmented data is assembled to form a defragmented data segment. The defragmented data segment corresponds to the jumbled, encrypted data output of operation 308 before fragmentation. The defragmented data segment is obtained using a table in the distributed security module 108 that identifies a data store of the plurality of data stores 110 where the fragmented segment is stored and which identifies a location of the fragmented segment on the data store.

At operation 406, the defragmented data segment of operation 404 is unencrypted. The defragmented data segment is unencrypted using a decryption key that is the same as the encryption key used at operation 308. When the defragmented data segment of operation 402 is unencrypted, a jumbled data segment is generated. The jumbled data segment corresponds to the output of operation 304.

At operation 408, a message with the unencrypted, jumbled data segment of operation 406 is sent to user computing device 102.

At operation 410, the data store jumble module 104 of user computing device 102 unjumbles the jumbled data segment in the message. The data store jumble module 104 makes use of the section pointers that were used originally to jumble the data. The section pointers identify a position of each section in the jumbled data segment and determine how to reorder the sections.

The flowcharts of FIGS. 3 and 4 describe one implementation of the present disclosure. Alternate implementations are possible. For example in one alternate implementation, the jumbling of data from user computing device 102 can be implemented on data store server computer 106 instead of on user computing device 102. For this implementation, unjumbling of data can also be implemented on data store server computer 106. One advantage of this alternate implementation is that a standard user device can be used without needing to add or modify a software application on user computing device 102 to implement jumbling and unjumbling of data.

In another alternate embodiment, data transmitted between user computing device 102 and data store server computer 106 can be encrypted before being transmitted. Encrypting the data before transmission can add another layer of security for any sensitive data being transmitted. If the data is jumbled before encrypting, then data store server 106 does not need to encrypt the data again. Instead, data store server computer 106 can just fragment the jumbled, encrypted data from the user computing device 102. With this embodiment, when the fragmented data stored on data stores 110 is accessed, data store server computer 106 sends unfragmented, jumbled, encrypted data to user computing device 102 and user computing device 102 both decrypts and unjumbles the unfragmented, jumbled, encrypted data.

In yet another alternate embodiment, instead of storing fragmented, jumbled, encrypted data on disparate data stores, for a partial security implementation all fragmented segments can be stored on one of data stores 110. Storing all fragmented sections on a same data store, while not as secure as storing fragmented sections on disparate data stores, can offer improved security over storing data without fragmenting, but at a lower cost than storing the fragmented sections on the disparate data stores.

An intermediate cost/security implementation can comprise storing the fragmented segments on a small number of data stores, for example on two or three data stores. For the intermediate cost/security implementation, some fragmented segments can be stored on a same data store, but not all fragmented segments. Additional alternate implementations are possible.

Figure 5:
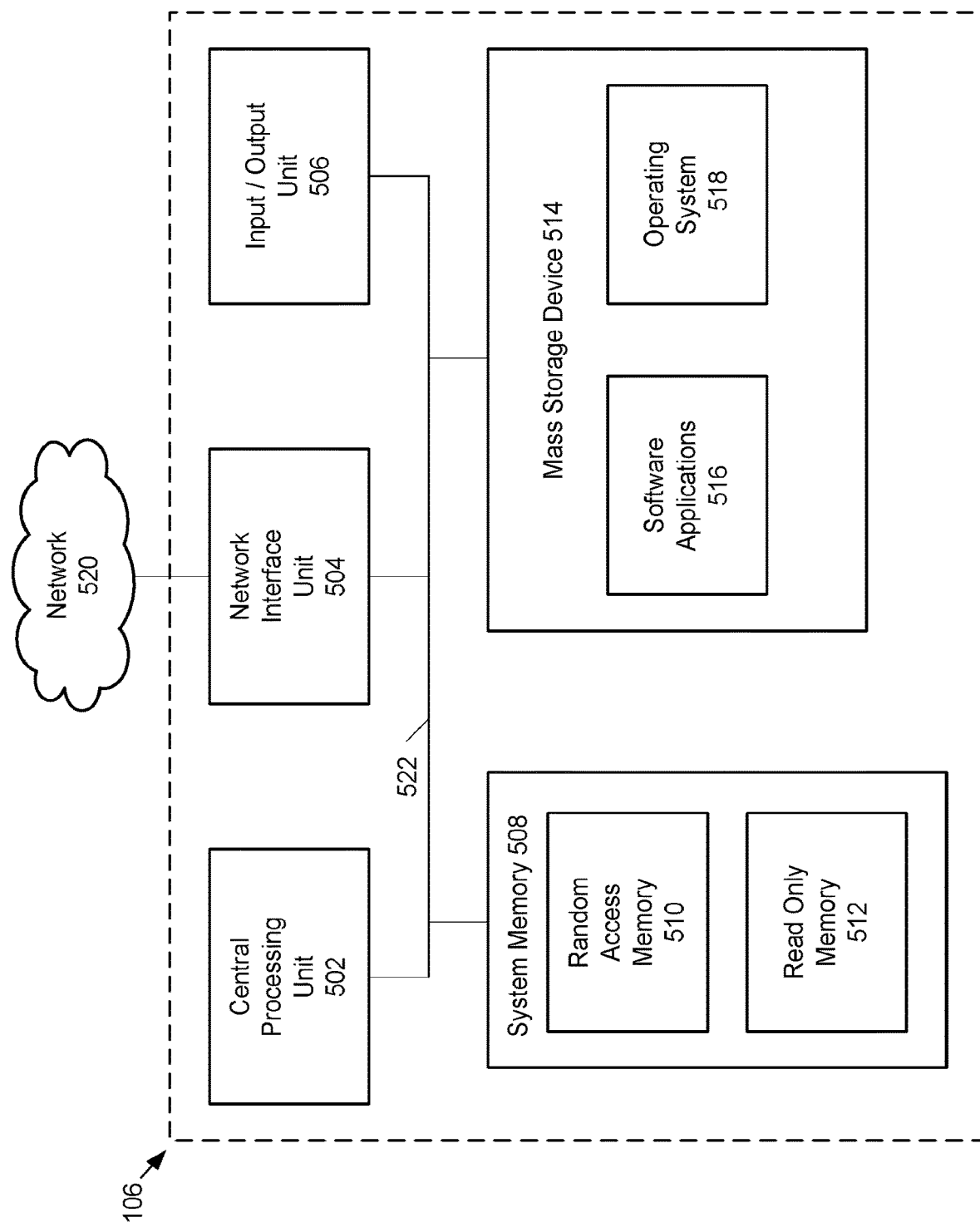
FIG. 5 shows example physical components of the data store server computer of FIG. 1.

As illustrated in the example of FIG. 5, data store server computer 106 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the data store server computer 106, such as during startup, is stored in the ROM 512. The data store server computer 106 further includes a mass storage device 514. The mass storage device 514 is able to store software instructions and data. Some or all of the components of the data store server computer 106 can also be included in user computing device 102.

The mass storage device 514 is connected to the CPU 502 through a mass storage controller (not shown) connected to the system bus 522. The mass storage device 514 and its associated computer-readable data storage media provide non-volatile, non-transitory storage for the data store server computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the data store server computer 106.

According to various embodiments of the invention, the data store server computer 106 may operate in a networked environment using logical connections to remote network devices through the network 520, such as a wireless network, the Internet, or another type of network. The data store server computer 106 may connect to the network 520 through a network interface unit 504 connected to the system bus 522. It should be appreciated that the network interface unit 504 may also be utilized to connect to other types of networks and remote computing systems. The data store server computer 106 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the data store server computer 106 can store software instructions and data. The software instructions include an operating system 518 suitable for controlling the operation of the data store server computer 106. The mass storage device 514 and/or the RAM 510 also store software instructions, that when executed by the CPU 502, cause the data store server computer 106 to provide the functionality of the data store server computer 106 discussed in this document. For example, the mass storage device 514 and/or the RAM 510 can store software instructions that, when executed by the CPU 502, cause the data store server computer 106 to display received data on the display screen of the data store server computer 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An electronic computing device comprising:
    a processing unit; and
    system memory, the system memory including instructions which, when executed by the processing unit, cause the electronic computing device to:
    receive first data, the first data including a plurality of first sections;
    jumble the first data to create first jumbled data, wherein jumbling the first data includes:
        changing an arrangement of the plurality of first sections of the first data; and
        creating first section pointers for each of the plurality of first sections to identify first offsets of each of the plurality of first sections within the first jumbled data;
    using an encryption key that is generated by hashing the first offsets in the first data, encrypt the first jumbled data to create second data;
    fragment the second data into a plurality of second sections; and
    store portions of the plurality of second sections of the second data in different data stores located in different geographical locations.

2. The electronic computing device of claim 1, wherein the instructions further cause the electronic computing device to:
    access the second data in the different data stores;
    defragment the second data to generate third data;
    unencrypt the third data to generate fourth data; and
    send the fourth data to a user device.

3. The electronic computing device of claim 1, wherein the plurality of second sections includes second section pointers specifying second offsets to corresponding sections of the plurality of first sections in the first data.

4. The electronic computing device of claim 1, wherein the encryption key is created from a portion of the first data according to a set of rules.

5. The electronic computing device of claim 1, wherein a seed from the encryption key is obtained from a header of the first data.

6. The electronic computing device of claim 1, wherein a seed for the encryption key is obtained from a portion of the first data based on rules applied to the first data.

7. The electronic computing device of claim 1, wherein lengths of the plurality of second sections are randomly generated.

8. A method implemented on an electronic computing device, the method comprising:
    receiving first data, the first data including a plurality of first sections;
    jumbling the first data to create first jumbled data, wherein jumbling the first data includes:
        changing an arrangement of the plurality of first sections of the first data; and
        creating first section pointers for each of the plurality of first sections to identify first offsets of each of the plurality of first sections within the first jumbled data;
    encrypting the first jumbled data to create second data using an encryption key generated by hashing the first offsets in the first data;
    fragmenting the second data into a plurality of second sections; and
    storing portions of the plurality of second sections of the second data in different data stores located in different geographical locations.

9. The method of claim 8, further comprising:
    accessing the second data in the different data stores;
    defragmenting the second data to generate third data;

unencrypting the third data to generate fourth data; and
sending the fourth data to a user device.

10. The method of claim 8, wherein the plurality of second sections includes second section pointers specifying second offsets to corresponding sections of the plurality of first sections in the first data.

11. The method of claim 8, wherein the encryption key is created from a portion of the first data according to a set of rules.

12. The method of claim 8, wherein a seed for the encryption key is obtained from a header of the first data.

13. The method of claim 8, wherein a seed for the encryption key is obtained from a portion of the first data based on rules applied to the first data.

14. The method of claim 8, wherein lengths of the plurality of second sections are randomly generated.

15. An electronic computing device comprising:
a processing unit; and
system memory, the system memory including instructions which, when executed by the processing unit, cause the electronic computing device to:
  receive first data, the first data including a plurality of first sections;
  generate an encryption key from a hash of offsets in the first data, the offsets being determined by a set of rules;
  jumble the first data to create first jumbled data, wherein jumbling the first data includes to:
    change an arrangement of the plurality of first sections of the first data; and
    create section pointers for each of the plurality of first sections to identify offsets of each of the plurality of first sections within the first jumbled data;
  using an encryption key, encrypt the first jumbled data to create second data;
  fragment the second data into a plurality of second sections; and
  store portions of the plurality of second sections of the second data in different data stores located in different geographical locations.

* * * * *